United States Patent
Zhang et al.

(10) Patent No.: US 9,902,598 B2
(45) Date of Patent: Feb. 27, 2018

(54) BRAKING SYSTEMS AND METHODS FOR A WINCH DRUM

(71) Applicant: Schlumberger Technology Corporation, Sugar Land, TX (US)

(72) Inventors: Kun Zhang, Shanghai (CN); Stephane Breard, Oust-Marest (FR); Pierre Jacquemont, Verton (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 669 days.

(21) Appl. No.: 14/369,552

(22) PCT Filed: Dec. 17, 2012

(86) PCT No.: PCT/US2012/070026
§ 371 (c)(1),
(2) Date: Jun. 27, 2014

(87) PCT Pub. No.: WO2013/101512
PCT Pub. Date: Jul. 4, 2013

(65) Prior Publication Data
US 2014/0332238 A1   Nov. 13, 2014

Related U.S. Application Data (60) Provisional application No. 61/580,561, filed on Dec. 27, 2011.

(51) Int. Cl.
*B66D 5/08* (2006.01)
*F16D 49/16* (2006.01)
(Continued)

(52) U.S. Cl.
CPC .......... *B66D 5/08* (2013.01); *B66D 5/26* (2013.01); *E21B 19/084* (2013.01); *F16D 49/16* (2013.01)

(58) Field of Classification Search
CPC  F16D 59/02; F16D 49/16; B66D 5/26; B66D 5/08; E21B 19/084
(Continued)

(56) References Cited

U.S. PATENT DOCUMENTS

| | | | | |
|---|---|---|---|---|
| 691,513 A | * | 1/1902 | Whitmore | B66D 5/00 188/174 |
| 1,314,675 A | * | 9/1919 | Lilly | B66B 5/08 192/140 |

(Continued)

FOREIGN PATENT DOCUMENTS

| CN | 2775015 Y | 4/2006 |
|---|---|---|
| CN | 101698463 A | 4/2010 |

(Continued)

OTHER PUBLICATIONS

International Search Report for International Application No. PCT/US2012/070026 dated Apr. 19, 2013.
(Continued)

*Primary Examiner* — Michael E Gallion
(74) *Attorney, Agent, or Firm* — Trevor G. Grove (57) ABSTRACT

Braking systems and methods are provided for a drum winch system having a winch drum having an outer surface and a winch drum braking system. The winch drum braking system has a first brake having a first brake lining, located adjacent to the winch drum, and a first three-ring ratchet linkage system connected to the first brake lining. The first three-ring ratchet linkage system is rotatable and adapted to move the first brake lining to a first position or a second position with respect to the outer surface of the winch drum. In the first position, the first brake lining contacts the outer surface of the winch drum to apply break force thereon, and, in the second position, the first brake lining is separated from the winch drum.

14 Claims, 4 Drawing Sheets

(51) Int. Cl.
*E21B 19/084* (2006.01)
*B66D 5/26* (2006.01)

(58) Field of Classification Search
USPC .......................................................... 254/378
See application file for complete search history.

(56) References Cited

U.S. PATENT DOCUMENTS

| | | | | |
|---|---|---|---|---|
| 1,317,798 A * | 10/1919 | Larson | .......................... | 187/288 |
| 2,289,107 A * | 7/1942 | Eames | .................... | F16D 49/16 |
| | | | | 188/171 |
| 2,652,132 A * | 9/1953 | Browning | ............... | F16D 49/16 |
| | | | | 188/75 |
| 2,685,945 A * | 8/1954 | Currie | .................... | F16D 49/16 |
| | | | | 188/171 |
| 2,693,866 A * | 11/1954 | Trombetta | .............. | F16D 49/16 |
| | | | | 188/171 |
| 2,747,698 A * | 5/1956 | Currie | .................... | F16D 49/16 |
| | | | | 188/171 |
| 2,908,359 A * | 10/1959 | Brueder | .................. | F16D 49/16 |
| | | | | 188/106 R |
| 3,348,639 A * | 10/1967 | Ames | .................... | F16D 49/16 |
| | | | | 188/171 |
| 3,356,190 A * | 12/1967 | Prussak | ................... | F16D 49/16 |
| | | | | 188/170 |
| 3,782,511 A * | 1/1974 | Parfitt | ................... | B61H 13/005 |
| | | | | 188/196 D |
| 3,830,344 A * | 8/1974 | Cervenec | ................ | B66B 29/00 |
| | | | | 188/171 |
| 4,023,655 A * | 5/1977 | Anzai | ..................... | B66D 5/08 |
| | | | | 188/162 |
| 4,031,987 A * | 6/1977 | Webb | ..................... | F16D 49/16 |
| | | | | 188/171 |
| 4,033,434 A * | 7/1977 | Henrich | ................... | F16D 49/16 |
| | | | | 188/171 |
| 4,074,891 A * | 2/1978 | Ritter | ....................... | B66D 5/26 |
| | | | | 212/86 |
| 4,116,308 A * | 9/1978 | Sever | ..................... | F16D 49/16 |
| | | | | 188/171 |
| 4,132,292 A * | 1/1979 | Dufresne | ................ | B66D 5/08 |
| | | | | 188/171 |
| 4,306,637 A * | 12/1981 | Keiser | .................... | B66D 5/08 |
| | | | | 188/170 |
| 4,326,609 A * | 4/1982 | Sala | ........................ | F16D 49/16 |
| | | | | 188/196 BA |
| 4,444,536 A * | 4/1984 | Brown | .................... | E21B 19/00 |
| | | | | 254/106 |
| 4,875,558 A * | 10/1989 | Berkhan | .................. | B66D 5/08 |
| | | | | 188/171 |
| 5,153,389 A * | 10/1992 | Nomura | .................... | B66D 5/08 |
| | | | | 187/288 |
| 5,265,701 A * | 11/1993 | Ogasawara | ............... | B66B 5/18 |
| | | | | 187/254 |
| 5,337,878 A * | 8/1994 | Mehlert | .................... | B66D 5/08 |
| | | | | 188/171 |
| 5,425,435 A * | 6/1995 | Gregory | .................... | B66D 5/14 |
| | | | | 188/264 A |
| 5,899,304 A * | 5/1999 | Daugherty | ............... | B66D 5/08 |
| | | | | 188/171 |
| 6,021,872 A * | 2/2000 | Sevilleja | ................. | B66B 5/027 |
| | | | | 187/266 |
| 6,289,727 B1 * | 9/2001 | Ammon | ................... | B66D 5/08 |
| | | | | 73/129 |
| 8,448,758 B2 * | 5/2013 | Xie | ......................... | B66D 5/08 |
| | | | | 188/161 |
| 2003/0062514 A1* | 4/2003 | Nagata | ..................... | B66D 5/08 |
| | | | | 254/378 |
| 2010/0108965 A1* | 5/2010 | Fujii | ........................ | B66D 5/26 |
| | | | | 254/277 |
| 2015/0014614 A1* | 1/2015 | Lisland | ..................... | B66D 1/72 |
| | | | | 254/325 |
| 2017/0050827 A1* | 2/2017 | Nield | ....................... | B66D 5/26 |

FOREIGN PATENT DOCUMENTS

| | | |
|---|---|---|
| CN | 201825688 U | 5/2011 |
| CN | 202007095 U | 10/2011 |
| DE | 2447172 A1 | 5/1975 |

OTHER PUBLICATIONS

Written Opinion for International Application No. PCT/US2012/070026 dated Apr. 19, 2013.
First Office Action issued in related CN application 201280070678.6 dated Jul. 29, 2015, 14 pages.
Partial European Search Report issued in related EP application 12862089.5 dated Sep. 15, 2015, 4 pages.
Office Action issued in related EP application 12862089.5 dated Sep. 23, 2015, 4 pages.

* cited by examiner

BRAKING SYSTEMS AND METHODS FOR A WINCH DRUM

FIELD OF THE INVENTION

Aspects of the disclosure relate to wireline operations. More specifically, aspects relate to braking systems and methods for a winch drum that may be used in drilling scenarios.

BACKGROUND OF THE DISCLOSURE

Installation of a drum band brake system onto a winch drum requires the winch drum to be installed before subsequent installation of the drum band brake system. As a result of installing the winch drum prior to the drum band brake system, one or more operators (hereinafter "operators") are required to complete the subsequent drum band brake system installation within a substantially limited space created by dimensions and structural features of the winch drum. Thus, the limited space makes the drum band brake system installation significantly difficult, cumbersome and time consuming. Additionally, operators often experience difficulty installing the drum band brake system because of the significant weight associated with the drum band brake system. Further, operators often experience breakage problems when fixing the drum band brake system onto an adjustment thread rod associated with the winch drum.

After the winch drum and drum band brake system has been in use for sometime, a space or gap between a brake lining of the drum band brake system and winch drum, created by wear of the brake lining, must be manually determined by the operators which requires the operators to physically feel the space or gap between the brake lining and the winch drum. After physically feeling the space or gap and determining the amount of space or gap between the brake lining and the winch drum, the operators must manually adjust the brake lining and the drum band brake system to compensate for the amount of space or gap. Once manual adjustment of the brake lining is complete, the operators must verify the performance of brake lining of the drum band brake system by conducting performance tests of the brake lining and winch drum which are time consuming, costly and often unreliable. At times, the brake lining of the drum band brake system may stick to winch drum because of the occurrence of one or more chemical reactions between a surface of the brake lining and a surface of the winch drum. Moreover, a brake lining of a drum band brake system, traditionally, is in the form of a band that is made of a flexible material which is often difficult to remove or separate from the winch drum when sticking occurs between surfaces of the brake lining and winch drum.

BRIEF DESCRIPTION OF THE DRAWINGS

So that features and advantages of the present disclosure can be understood in detail, a more particular description of the disclosure may be had by reference to the embodiments thereof that are illustrated in the appended drawings. It is to be noted, however, that the appended drawings illustrate some embodiments of this disclosure and are therefore not to be considered limiting of its scope, for the disclosure may admit to other equally effective embodiments.

DETAILED DESCRIPTION

Figure 1:
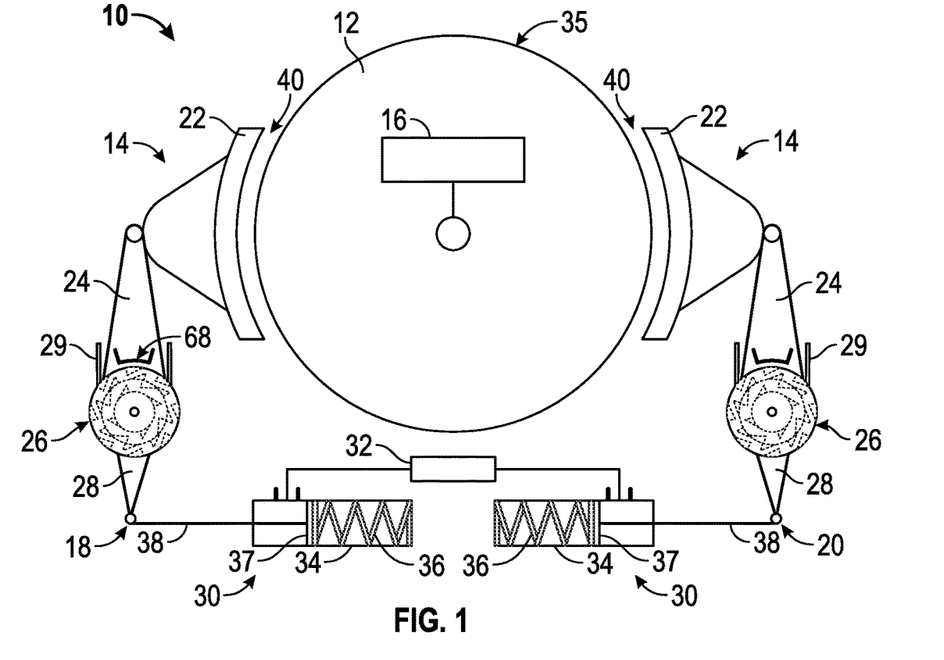
FIG. 1 illustrates a schematic cross-sectional view of a winch drum system with a winch drum braking system.
Figure 7:
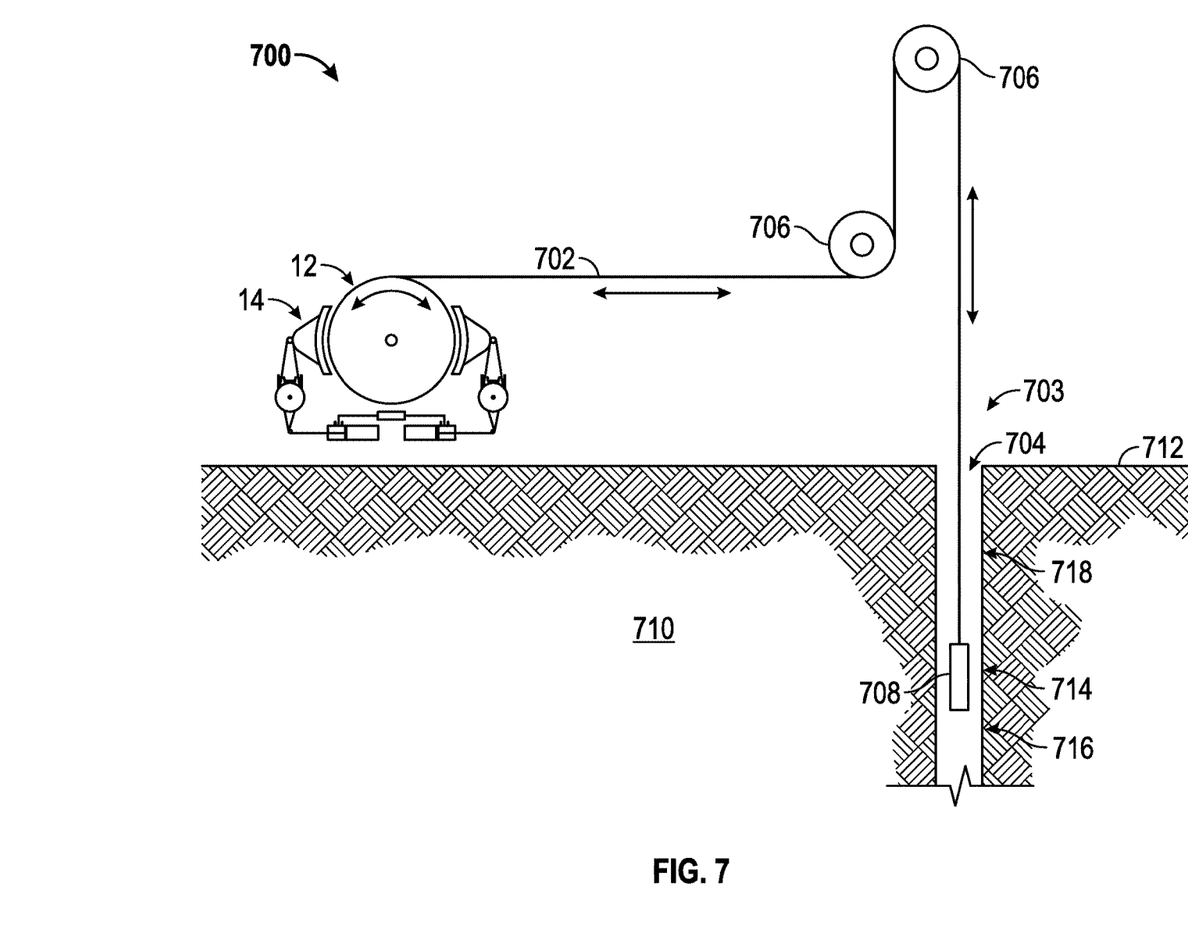
FIG. 7 is a schematic representation of a wireline cable oil field operation using a winch drum system with a winch drum braking system.

Referring now to the drawings wherein like numerals refer to like parts, FIG. 1 illustrates a winch drum system 10 which may have a winch drum 12 (hereinafter "drum 12") and winch drum braking system 14 (hereinafter "braking system 14") for the drum 12. A wire rope (not shown in FIGS. 1-6) may be attached and/or connected to the drum 12. In embodiments, the wire rope may be, for example, a wireline cable 702 (as shown in FIG. 7). The drum 12 may be sized and/or configured to receive and/or store an entire length of or at least a portion of the entire length of the wire rope. A power or energy source 16 (hereinafter "power source 16") may provide mechanical power and/or energy to the drum 12 such that the drum 12 may be rotated in a clockwise direction and/or a counter-clockwise direction via the power source 16. The power source 16 may be, for example, a drum motor and/or the like. The drum 12 may release and/or retrieve the entire length or at least a portion of the entire length of the wire rope by rotating in the clockwise direction and/or the counter-clockwise direction. For example, the drum 12 may reel up and/or reel down the entire length or at least a portion of the entire length of the wire rope by rotating in the clockwise and/or the counter-clockwise direction. The braking system 14 may be activated and/or engaged to apply braking forces to the drum 12 which may reduce and/or terminate rotation of the drum 12 in the clockwise and/or counter-clockwise directions. As a result, rotation of the drum 12 may be controlled, reduced and/or terminated by the braking forces which may be applied to the drum 12 by the brake system 14. In embodiments, the power source 16 of the drum 12 may be, for example, an actuator, a motor, such as, an electric motor, or an engine, such as, an internal combustion engine or a diesel engine. The present disclosure should not be deemed as limited to a specific embodiment of the power source 16 of the drum 12.

Figure 4:
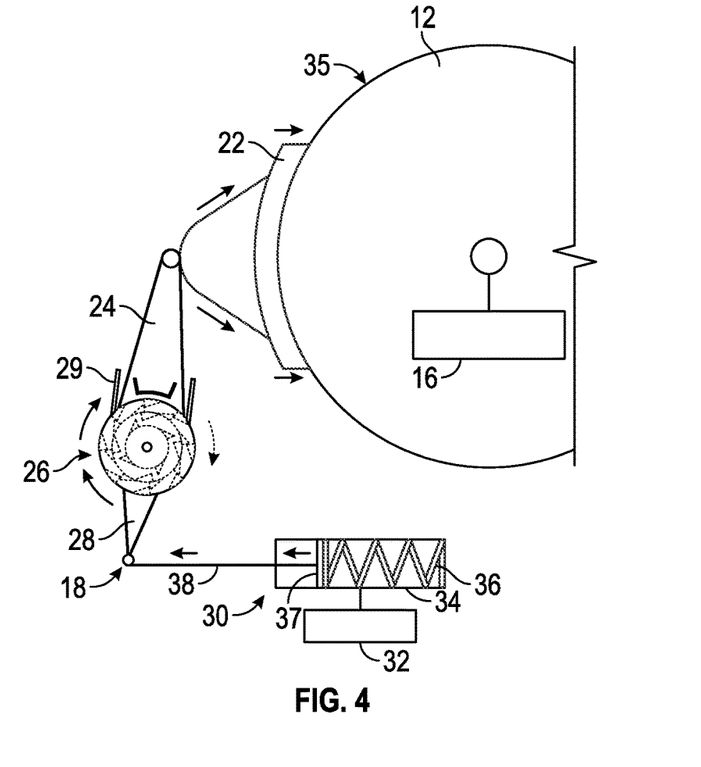
FIG. 4 illustrates a schematic cross-sectional view of a first portion of a winch drum system with a first brake of a winch drum braking system.
Figure 6:
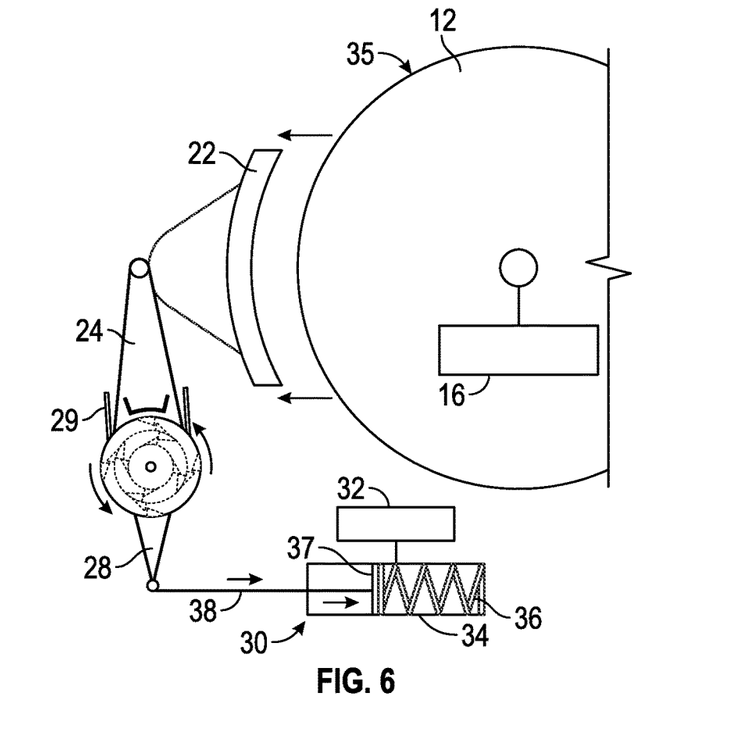
FIG. 6 illustrates a schematic cross-sectional view of a first portion of a winch drum system with a first brake of a winch drum braking system.

The braking system 14 may have at least a first band brake 18 (hereinafter "first brake 18") and/or a second band brake 20 (hereinafter "second brake 20"). The first brake 18 and/or the second brake 20 (hereinafter collectively known as "the first and second brakes 18, 20") may have a brake lining 22, and an upper arm 24, a ratchet linkage system 26 (hereinafter "linkage system 26"), a lower arm 28, a plate 29 with a ring and/or an actuator 30. An energy or power source 32 (hereinafter "energy source 32") may provide mechanical and/or electrical energy or power to the actuator 30 of the first and second brakes 18, 20. As a result, the actuator 30 of the first and second brakes 18, 20 may be activated, actuated, engaged, terminated and/or controlled by the energy source 32. Moreover, operators may activate, actuate, engage, terminate and/or control the actuator 30 of the first and second brakes 18, 20 via the energy source 32 and/or a controller (not shown in the drawings). In embodiments, the actuator 30 may be a hydraulic cylinder 34 (hereinafter "cylinder 34") having a spring 36 and/or a piston 37 located and/or positioned within the cylinder 34 as shown in FIGS. 1, 4 and 6. In embodiments, the cylinder 34 may be filled or at least partially filled with one or more hydraulic fluids which may be pumped into or out of the cylinder 34 to compress or to release the spring 36, respectively, and/or to move and/or drive the piston 37. It should be understood that the present disclosure is not deemed limited to a specific embodiment of the actuator 30 of the first and second brakes 18, 20, the energy source 32 of the braking system 14 and/or the hydraulic fluids of the cylinder 34.

In embodiments, at least one of the first and second brakes 18, 20 may be, for example, a winch drum band brake having the brake lining 22 which may be, for example, a band or belt made of at least one flexible material. The brake lining 22 may apply and/or exert braking forces onto an outer surface 35 of the drum 12 when the first and second brakes 18, 20 of the brake system 14 is activated and/or engaged. As a result, the brake lining 22 of the first and second brakes 18, 20 may reduce and/or control a rotational speed of the drum 12 and/or may terminate rotation of the drum 12 by applying and/or exerting the braking forces onto the outer surface 35 of the drum 12. The band or belt of the brake lining 22 may be made from any flexible material capable of applying and/or exerting braking forces onto the outer surface 35 of the drum 12 as known to one of ordinary skill in the art. As will be understood by a person of skill in the art, a pneumatic cylinder may be used alternatively where a hydraulic cylinder is used.

The upper arm 24 of the first and second brakes 18, 20 may connect and/or attach the brake lining 22 to the linkage system 26, the lower arm 28 and/or the actuator 30. The lower arm 28 of the first and second brakes 18, 20 may connect and/or attach the brake lining 22, the upper arm 24 and/or linkage system 26 to the actuator 30. The first and second brakes 18, 20 may have a rod 38 which may attach and/or connect the brake lining 22, the upper arm 24, the linkage system 26 and/or lower arm 28 to the actuator 30.

Figure 2:
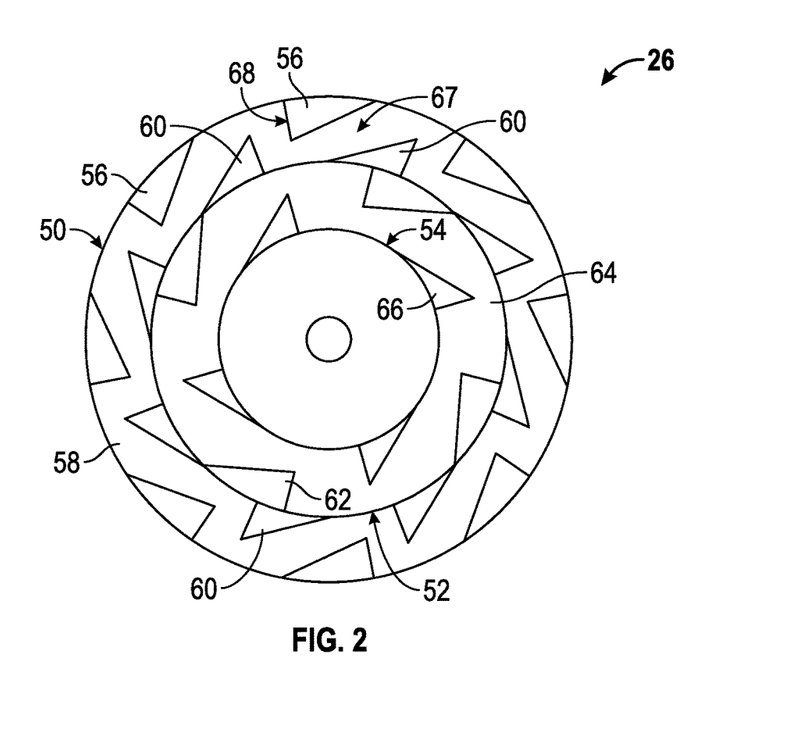
FIG. 2 illustrates a schematic cross-sectional view of a pivot linkage system of the winch drum braking system.

The linkage system 26 may be, for example, a ratchet mechanism, such as, a three-ring ratchet mechanism having an outer ring 50, an intermediate ring 52 and/or inner ring 54 as shown in FIG. 2. The upper arm 24 may be connected and/or attached to and/or integrally formed with the outer ring 50 of the linkage system 26, and the lower arm 28 may be connected and/or attached to and/or integrally formed with the intermediate ring 52 of the linkage system 26 as shown in FIG. 1. In embodiments, the linkage system 26 may be a ratchet mechanism having more than or less than three ratcheting rings.

The linkage system 26 of the first and second brakes 18, 20 may be a pivot and/or rotational point for the first and second brakes 18, 20. The brake lining 22, the upper arm 24 and/or the lower arm 28 of the first and second brakes 18, 20 may be moved, displaced, pivoted and/or rotated, with respect to the linkage system 26, in the clockwise direction and/or the counter-clockwise direction via the linkage system 26. For example, the brake lining 22, the upper arm 24 and/or the lower arm 28 of the first brake 18 may rotate in the clockwise direction via the linkage system 26 of the first brake 18. As a result, the brake lining 22 of the first brake 18 may move inward with respect to the outer surface 35 of the drum 12, may contact and/or abut the outer surface 35 of the drum 12 and/or may apply and/or exert braking forces onto the outer surface 35 of the drum 12 as shown in FIG. 4. Moreover, the brake lining 22, the upper arm 24 and the lower arm 28 of the first brake 18 may pivot and/or rotate in the counter-clockwise direction via the linkage system 26 of the first brake 18. As a result, the brake lining 22 of the first brake 18 may separate from the drum 12, move outwardly with respect to the outer surface 35 of the drum 12 and/or move away from the drum 12 as shown in FIG. 6.

In embodiments, the outer ring 50 of the linkage system 26 may have more than one pawl 56 (hereinafter "pawl 56") which may extend inwardly from the outer ring 50 into an interior 58 of the outer ring 50 as shown in FIG. 2. The intermediate ring 52 of the linkage system 26 may have more than one outer pawl 60 (hereinafter "outer pawl 60") and/or more than one inner pawl 62 (hereinafter "inner pawl 62"). The outer pawl 60 of the intermediate ring 52 may extend outwardly from the intermediate ring 52 into the interior 58 of the outer ring 50. The inner pawl 62 of the intermediate ring 52 may extend inwardly from the intermediate ring 52 into an interior 64 of the intermediate ring 52. The inner ring 54 of the linkage system 26 may have more than one pawl 66 (hereinafter "pawl 66") which may extend outwardly from the inner ring 54 into the interior 64 of the intermediate ring 52. The present disclosure should not be deemed limited to a specific number of pawls for the pawl 56 of the outer ring 50, the outer pawl 60 and/or inner pawl 62 of the intermediate ring 52, and/or the pawl 66 of the inner ring 54.

The pawl 56 of the outer ring 50 and the outer pawl 60 of the intermediate ring 52 may be sized and adapted to interact with each other and/or contact, abut, move and/or displace each other when the outer ring 50 and/or the intermediate ring 52 may be pivoted and/or rotated, with respect to each other, in the clockwise direction and/or the counter-clockwise direction. For example, the intermediate ring 52 of the first brake 18 may rotate in the clockwise direction and the outer pawl 60 of the intermediate ring 52 may interact and/or contact with the pawl 56 of the outer ring 50 of the first brake 18 located above and/or clockwise with respect to the outer pawl 60 as shown by the arrows adjacent in the interior 58 of the outer ring 50 in FIG. 3. The outer pawl 60 of the intermediate ring 52 may contact and/or abut the pawl 56 of the outer ring 50, and the outer pawl 60 may move and/or displace the pawl 56 and the outer ring 50 in the clockwise direction as shown by the dashed arrows outside of the outer ring 50 in FIG. 3. As a result, the lower arm 28, the upper arm 24 and/or the brake lining 22 of the first brake 18 may move in the clockwise direction, and the brake lining 22 may contact the drum 12 and/or may apply and/or exert braking forces onto the outer surface 35 of the drum 12 as shown by the arrows in FIG. 4. The linkage system 26 of the second brake 20 may operate in a manner similar to the linkage system 26 of the first brake 18; however, clockwise movement of the brake lining 22 of the second brake 20 may move, displace, pivot and/or rotate the upper arm 24 and/or the brake lining 22 of the second brake 20 away from the drum 12.

Figure 5:
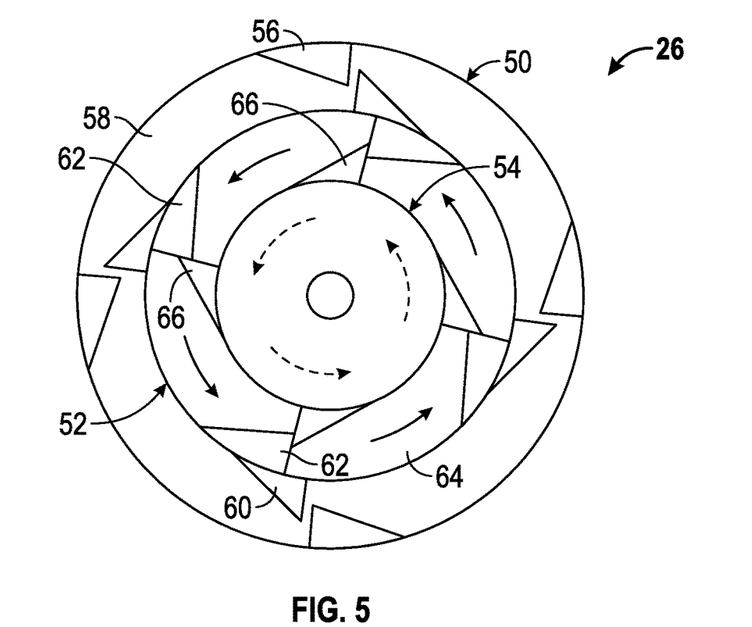
FIG. 5 illustrates a schematic cross-sectional view of a pivot linkage system of the winch drum braking system.

In embodiments, the intermediate ring 52 of the first brake 18 may rotate in the counter-clockwise direction and the outer pawl 60 of the intermediate ring 52 may interact with the pawl 56 of the outer ring 50 of the second brake 20 located below and/or counter-clockwise with respect to the outer pawl 60 as shown by the arrows in the interior 58 of the outer ring 50 in FIG. 5. The outer pawl 60 of the intermediate ring 52 may contact and/or abut the pawl 56 of the outer ring 50, and the outer pawl 60 may move and/or displace the pawl 56 and the outer ring 50 in the counter-clockwise direction as shown by the dashed arrows outside of the outer ring 50 in FIG. 5. As a result, the lower arm 28, the upper arm 24 and/or the brake lining 22 of the first brake 18 may pivot and/or rotate in the counter-clockwise direction, and the brake lining 22 and/or upper arm 24 of the first brake 18 may be moved and/or displaced in the counter-clockwise direction and away from the drum 12 as shown by the arrows in FIG. 6. The linkage system 26 of the second brake 20 may operate in a manner similar to the linkage system 26 of the first brake 18; however, clockwise movement of the brake lining 22 of the second brake 20 may separate the brake lining 22 from the drum 12 and/or move the brake lining 22 and/or upper arm 24 of the second brake 20 away from the drum 12.

The pawl 66 of the inner ring 54 and the inner pawl 62 of the intermediate ring 52 may be sized and adapted to interact with each other and/or contact, abut, move and/or displace each other when the inner ring 54 and/or the intermediate ring 52 may be pivoted and/or rotated, with respect to each other, in the clockwise direction and/or the counter-clockwise direction. For example, the inner ring 54 of the first brake 18 may rotate in the counter-clockwise direction and the pawl 66 of the inner ring 54 may interact with and/or contact the inner pawl 62 of the intermediate ring 52 of the first brake 18 as shown by the dashed arrow inside of the inner ring 54 in FIG. 7. The pawl 66 of the inner ring 54 may contact and/or abut the inner pawl 62 of the intermediate ring 52, and the pawl 66 of the inner ring 54 may move and/or displace the inner pawl 62 of the intermediate ring 52 in the counter-clockwise direction as shown by the arrow in the interior 64 of the intermediate ring 52. As a result, the intermediate ring 52 and the outer pawl 60 of the intermediate ring 52 may move or rotate in the counter-clockwise direction as shown by the dashed arrow in the interior 58 of the outer ring 50. Additionally, the outer pawl 60 of the intermediate ring 52 may contact and/or abut the pawl 56 of the outer ring 50 of the first brake 18 located below and/or counter-clockwise with respect to the outer pawl 60 of the intermediate ring 52 when the outer pawl 60 may pivot and/or rotate in the counter-clockwise direction. As a result, the outer pawl 60 of the intermediate ring 52 may move, pivot, rotate and/or displace the pawl 56 of the outer ring 50 in the counter-clockwise direction as shown by the arrow outside of the outer ring 50. Thus, the outer ring 50, the lower arm 28, the upper arm 24 and/or the brake lining 22 of the first brake 18 may move, pivot, rotate and/or be displaced in the counter-clockwise direction and away from the drum 12 as shown by the arrows in FIG. 6. The linkage system 26 of the second brake 20 may operate in a manner similar to the linkage system 26 of the first brake 18; however, counter-clockwise movement of the brake lining 22 of the second brake 20 may apply and/or exert braking forces onto the outer surface 35 of the drum 12.

In embodiments, the power source 16 associated with the drum 12 may rotate the drum 12 in the clockwise direction and/or the counter-clockwise direction to release, deploy or reel down or retrieve or reel up the entire length of and/or a portion of the entire length of the wire rope. For example, the power source 16 may rotate the drum 12 in the clockwise at a first rotational speed. As a result, at least a portion of the wire rope may be deployed from the drum 12. It may be desirable to reduce the rotational speed of the drum 12, reduce the rate of deployment of the wire rope and/or terminate rotation of the drum 12 or deployment of the wire rope. The braking system 14 may be activated and/or engaged by, for example, an operators to apply braking forces against the outer surface 35 of the drum 12 via the brake lining 22 of the first and second brakes 18, 20. As a result, rotation of the drum 12, in the clockwise direction, may be reduced from the first rotational speed to a second rotational speed and/or may be terminated by the braking forces applied to the outer surface 35 of the drum 12 by the brake lining 22 of the first and second brakes 18, 20. Thus, rotation of the drum 12 may be controlled, reduced, and/or terminated by the braking forces applied by the brake lining 22 of the first and second brakes 18, 20.

In embodiments, the energy source 32 may activate, actuate and/or engage the actuator 30 of the first and second brakes 18, 20. For example, hydraulic fluids within the cylinder 34 may be removed from or pumped from the cylinder 34 to empty or at least partially empty the cylinder 34. As a result, the spring 36 and/or piston 37 located within the cylinder 34 may expand and/or move outwardly within the cylinder 34. As a result, the spring 36 and/or the piston 37 may apply and/or exert an outward force from within the cylinder 34 onto the rod 38. The outward force applied by the spring 36 and/or the piston 37 may drive and/or move the rod 38 of the first and second brakes 18, 20 outwardly away from the cylinder 34 of the first and second brakes 18, 20. As a result, the rod 38 may drive, pivot, rotate and/or move the lower arm 28 of the first and second brakes 18, 20 outwardly away from the cylinder 34 of the first and second brakes 18, 20 and/or in a clockwise or counter-clockwise direction, respectively.

Figure 3:
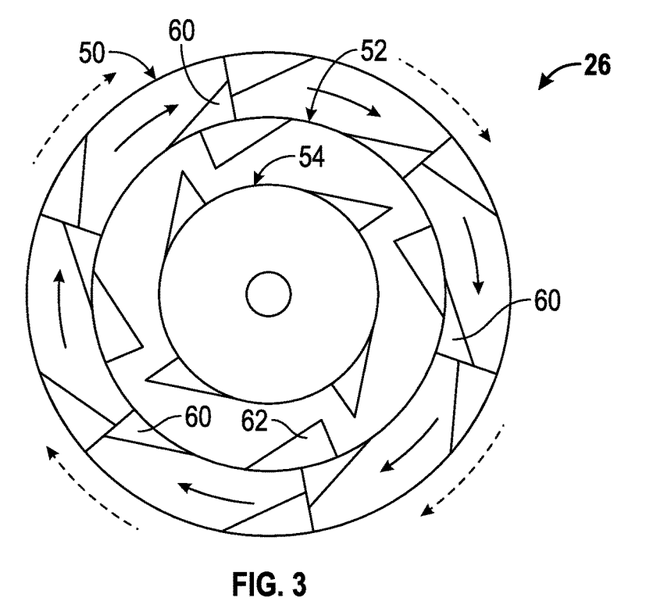
FIG. 3 illustrates a schematic cross-sectional view of a pivot linkage system of the winch drum braking system.

For the first brake 18, the outward movement of the rod 38 with respect to the actuator 30 of the first brake 18 may drive, pivot, move and/or rotate the lower arm 28, the intermediate ring 52 (which may be attached and/or connected to the lower arm 28) and/or the outer pawl 60 of the intermediate ring 52 in the clockwise direction as shown in FIGS. 3 and 4. The outer pawl 60 of the intermediate ring 52 may displace, move, pivot and/or rotate the pawl 56 of the outer ring 50 and the outer ring 50 (which may be connected and/or attached to the upper arm 24) in the clockwise direction. As a result, the lower arm 28, the upper arm 24 and/or the brake lining 22 of the first brake 18 may pivot and/or rotate in the clockwise direction, may contact and/or abut the outer surface 35 of the drum 12 and/or may apply braking forces to the outer surface 35 of the drum 12 as shown in FIG. 4.

For the second brake 20, the outward movement of rod 38 with respect to the actuator 30 of the second brake 20 may drive, move, pivot and/or rotate the lower arm 28, the intermediate ring 52 and/or the outer pawl 60 of the intermediate ring 52 in the counter-clockwise direction. The outer pawl 60 of the intermediate ring 52 may drive, move, pivot and/or rotate the pawl 56 of the outer ring 50 and the outer ring 50 in the counter-clockwise direction. As a result, the lower arm 28 (which may be attached and/or connected to the intermediate ring 52), the upper arm 24 (which may be attached and/or connected to the outer ring 50) and/or the brake lining 22 of the second brake 20 may rotate in the counter-clockwise direction, may contact and/or abut the outer surface 35 of the drum 12 and/or may apply braking forces to the outer surface 35 of the drum 12.

The braking forces applied to the drum 12 by the brake lining 22 of the first and second brakes 18, 20 may reduce rotational speed of the drum 12 from the first rotational speed to the second rotational speed and/or may terminate rotation of the drum 12. As a result, rotation of the drum 12 may be controlled, reduced and/or terminated by the breaking forces applied by the brake lining 22 of the first and second brakes 18, 20 of the braking system 14. Thus, braking of the drum 12 may be accomplished by the braking forces applied to the drum 12 by the first and second brakes 18, 20 of the braking system 14.

In embodiments, after the braking forces may be applied to the drum 12 by the braking system 14, it may be desirable to relieve and/or remove the braking forces from the drum 12. The cylinder 34 of the actuator 30 of the first and second brakes 18, 20 may be filled or at least partial filled with hydraulic fluids which may compress or retract the spring 36 and/or the piston 37 inwardly within the cylinder 34. The outward force that was being applied and/or exerted by the spring 36 and/or the piston 37 onto the rod 38 may be reduced and/or terminated when the cylinder 35 may be filled or at least partial filled with the hydraulic fluids. As a result, the upper arm 24 and/or the brake lining 22 of the first and second brakes 18, 20 may pivot, rotate and/or move away from the drum 12 and/or the outer surface 35 of the drum 12. The breaking forces from the brake lining 22 of the first and second brakes 18, 20, which may have been applied to the outer surface 35 of the drum 12, may be relieved, reduced and/or terminated when the outward force from the spring 36 and/or the piston 37 is reduced and/or terminated. In embodiments, the brake lining 22 of the first and second brakes 18, 20 may be stuck and/or held against and/or adjacent to the drum 12, but without application of braking forces onto the drum 12. Thus, the braking forces applied to drum 12 by the braking system 14 may be removed, relieved, reduced and/or terminated by filling and/or partially filing the cylinder 34 with hydraulic fluids and/or reducing and/or terminating the outward force applied to the rod 38 by the spring 36 and/or the piston 37 of the first and second brakes 18, 20.

In embodiments, the drum 12 may be rotating, in, for example, the counter-clockwise direction at the first rotational speed, and reeling up or retrieving a portion of the wire rope, and the brake system 14 and/or linkage system 26 may be in a free-wheel or unlocked configuration as shown in FIGS. 1 and 2, respectively. For example, before or after the braking system 14 may engage the drum 12, the brake system 14 may be in the free-wheel and/or unlocked configuration and/or may be adapted to facilitate automatic wear adjustment with respect to the brake lining 22 of the first and second brakes 18, 20. The brake lining 22 of the first and second brakes 18, 20 may experience surface wear during operation and/or use which may be cause by the brake lining 22 applying or exerting braking forces, one or more times, to the outer surface 35 of the drum 12. For example, a portion of the brake lining 22 may be removed and/or separated from the brake lining 22 due to one or more frictional forces between the outer surface 35 of the drum 12 and the brake lining 22 when the brake system 14 may be applying braking forces onto the drum 12. In embodiments, the linkage system 26 may provide automatic wear adjustment with respect to the brake lining 22 of the first and second brakes 18, 20 which may facilitate maintenance of the braking system 14 of the winch drum system 10.

The linkage mechanism 26 of the first and second brakes 18, 20 may be configured and/or adapted to provide an amount of friction between the outer ring 50 and the intermediate ring 52 when the braking system 14 is not activated and/or not engaging the drum 12 and/or when the brake system 14 and/or linkage system 26 may be in the free-wheel and/or unlocked configuration. The amount of friction between the outer ring 50 and the intermediate ring 52 provided by the linkage mechanism 26 may be such that a weight of the brake lining 22 may incline the outer ring 50 of the linkage mechanism 26 with respect to the outer pawls 60 of the intermediate ring 52. With the outer ring 50 in an inclined position, the pawl 56 of the outer ring 50 may be located and/or positioned at an adjustment location 68 which may be located between two adjacent outer pawls 60 of the intermediate ring 52 as shown in the top portion of FIGS. 1 and 2. As a result, the pawl 56 of the outer ring 50, in the adjustment location 68, may not abut and/or be in contact with the pawl 60 of the intermediate ring 52. The upper arm 24, which may be connected and/or attached to the outer ring 50, may be located and/or positioned at the adjustment location between the two adjacent outer pawls 60 of the intermediate ring 52. As a result, the upper arm 24 and/or the brake lining of the first and second brakes 18, 20 may be positioned, located, held and/or maintained at the adjustment location 68 which may be between the two adjacent outer pawls 60 of the intermediate ring 52 and away from the drum 12 as shown in FIG. 1. The braking system 14 may automatically adjust for wear to the brake lining 22 of the first and second brakes 18, 20 by positioning, locating, holding and/or maintaining the upper arm 24 and/or the brake lining 22 of the first and second brakes 18, 20 at the adjustment position 68 between the two adjacent outer pawls 60 of the intermediate ring 52 and away from the drum 12. As a result, a space 40 may be created, formed and/or maintained between the brake lining 22 and the outer surface 35 of the drum 12 when the linkage system 26 is in the free-wheel and/or unlocked configuration and/or when the pawl 56 of the outer ring 50 and/or the upper arm 24 is located in the adjustment position 68 as shown in FIGS. 1 and 2.

In embodiments, during installation of the drum 12 and/or braking system 14, the braking system 14 may be assembled prior to installation of the drum 12. For example, the operators may assemble the linkage system 26 manually or prior to installation of the braking system 14. The pawls 56 of the outer ring 50, the outer pawls 60 and/or the inner pawls 62 of the intermediate ring 52 and/or the pawls 66 of the inner ring 54 may be manually positioned or in a preset position relative with respect to each other during or prior to installation of the linkage system 26. After installation of the braking system 14, the brake lining 22 and the upper arm 24 of the first and second 18, 20 brake may be moved, pivoted, rotated and/or positioned in the counter-clockwise and clockwise positions, respectively. As a result, a distance between the brake lining 22 of the first and second brakes 18, 20 may be increased to provide installation space for installation of the drum 12 between the brake lining 22 of the first and second brakes 18, 20. Thus, outward tilting of the brake lining 22 and the upper arm 24 of the first and second brakes 18, 20 may provide additional installation space for the drum 12 between the brake lining 22 of the first and second brakes 18, 20.

In embodiments, after the brake lining 22 of the first and second brakes 18, 20 may have applied braking forces to the drum 12 and the braking forces of the brake lining 22 may have been relieved by the linkage system 26, the spring 36 and/or the piston 37, the brake lining 22 or at least a portion of the brake lining 22 may stick or be held against to the outer surface 35 of the drum 12 because of, for example, one or more frictional forces between the brake lining 22 and the outer surface 35 of the drum 12. For example, the one or more fractional forces may be caused by static forces between the brake lining 22 and the outer surface 35 or forces caused by one or more chemical reactions that may occur between the brake lining 22 and the outer surface 35. The spring 36 and/or the piston 37 of the hydraulic cylinder 34 may be compressed, drove and/or moved inwardly with respect to the cylinder 34. As a result, the inner ring 54 may move, pivot and/or rotate in, for example, the counter-clockwise direction for the first brake 18 (as shown by the dashed arrow inside the inner ring 54 in FIG. 7) and in the clockwise for the second brake 20. For example, the counter-clockwise movement of the inner ring 54 of the first brake 18 may move the inner pawls 62 and/or the outer pawls 60 of the intermediate ring 52, the intermediate ring 52, the pawls 56 of the outer ring 50 and/or the outer ring 50 in the counter-clockwise direction as shown by the arrows within the interior 64 of the intermediate ring 52, the dashed arrows within the interior 58 of the outer ring 50 and/or the arrow outside the outer ring 50 in FIG. 6). The counter-clockwise movement of the outer ring 50 of the first brake 18 may displace, move, pivot and/or rotate the upper arm 24 and/or the brake lining 22 of the first brake 18 in the counter-clockwise direction. As a result, the brake lining 22 of the first brake 18 may be displaced, moved, pivoted and/or rotated counter-clockwise and/or away from the drum 12 and/or removed from the outer surface 35 of the drum 12 as shown in FIG. 6. The present disclosure should not be deemed as limited to a specific embodiment of the frictional forces between the brake lining 22 and the outer surface 35 of the drum 12.

For the linkage system 26 of the second brake 20, the inner ring 50, the intermediate ring 52 and/or the outer ring 50 may be displaced, moved, pivoted and/or rotated in the clockwise direction. The clockwise movement of the outer ring 50 of the second brake 20 may displace, move, pivot and/or rotate the upper arm 24 and/or the brake lining 22 of the second brake 20 in the clockwise direction. As a result, the brake lining 22 of the second brake 20 may be displaced, moved, pivoted and/or rotated clockwise and/or away from the drum 12 and/or removed from the outer surface 35 of the drum 12. Thus, counter-clockwise movement of the brake lining 22 of the first brake 18 and/or clockwise movement of the brake lining 22 of the second brake 20 may reduce, prevent and/or terminate one or more sticking and/or holding situations between the brake lining 22 of the first and second brakes 18, 20 and the outer surface 35 of the drum 12 which may be caused by the one or more frictional forces.

In embodiments, the winch drum system 10 having the drum 12 and the braking system 14 may prevent or reduce a number of occurrences whereby the operators manually conducted and/or performed one or more brake adjustments with respect to the brake lining 22 of the first and second brakes 18, 20. When the brake system 14 may be in the free-wheel and/or unlocked configuration (see FIGS. 1 and 2), an increased amount of air may be provided and/or may contact the outer surface 35 of the drum 12 and/or the brake lining 22 of the first and second brakes 18, 20 which may provide lower temperatures at the outer surface 35 of the drum 12 and/or the brake lining 22. As a result of the lower temperatures, the one or more frictional forces between the brake lining 22 and the outer surface 35 may be reduced and/or terminated. During an occurrence of a sticking and/or holding situation between outer surface 35 of the drum 12 and the brake lining 22 of the first and second brakes 18, 20, the linkage system 26 of the first and second brakes 18, 20 may prevent the operators from having to manually release the brake lining 22 of the first and second brakes 18, 20 from the outer surface 35 of the drum 12. Moreover, the outward tilting of the upper arm 24 and the brake lining 22 of the first and second brakes 18, 20 may provide installation space to facilitate efficient and timely installing and/or changing of the drum 12 of the winch drum system 10.

In embodiments, the winch drum system 10 may be utilized for hauling, hoisting and/or conveying wire rope and/or one or more components that may be attached and/or connected to the wire rope. The winch drum system 10 may be utilized in one or more industries, such as, for example, the agricultural industry, the automotive industry, the construction industry, the maritime industry, the mining industry, the sports industry, the theater/entertainment industry, the oil industry and/or the like. It should be understood that the winch drum system 10 may be utilized in any industry for hauling, hoisting and/or conveying a wire rope and/or one or more components connected and/or attached to the wire rope as known to one of ordinary skill in the art.

In embodiments, a wireline cable winch drum system 700 (hereinafter "winch drum system 700") may include the wireline cable winch drum 12, the braking system 14 including the first and second brakes 18, 20, and a wireline cable 702 (hereinafter "cable 702") spooled and/or stored thereon the drum as shown in FIG. 8. The winch drum system 700 with the wireline cable 802 may be, for example, used in one or more wireline oil well applications. As shown in FIG. 7, the winch drum system 700 may be located and/or positioned locally to, adjacent to and/or in close proximity to a wellsite system 703 having a wellbore 704.

Once located and/or positioned locally with respect to and/or adjacent or proximate to the wellbore 704 at the wellsite system 703, the cable 702 may connected to, for example, a pair of sheave wheels 706, which may guide the cable 702 from the drum 12 of the winch drum system 700 into the wellbore 704. An end of the cable 702 may be connected to at least one downhole component 708 (hereinafter "downhole component 708"). As a result, the winch drum system may convey and/or deploy the cable 702 and/or the downhole component 708 in the wellbore 704 of the wellsite system 703. The downhole component 708 may be any downhole component capable of being utilized during one or more oil well operations in the wellbore 704 and/or at the wellsite system 703 as known to one of ordinary skill in the art.

The cable 702 may adapted and/or configured to provide unidirectional or bidirectional communication of digital signals, data, information and/or instructions and/or electrical power or energy between the Earth's surface 712 and the downhole component 708. As a result, the downhole component 708 may receive digital signals, data, information and/or instructions and/or electrical power or energy from the Earth's surface 712 via the cable 702. Moreover, the downhole component 708 may transmit and send one or more digital signals, data, information and/or instructions to the Earth's surface via the cable 702. It should be understood that the cable 702 may be any cable capable of providing unidirectional or bidirectional communication between the Earth's surface 712 and the downhole component 708 as known to one of ordinary skill in the art. The present disclosure should not be limited to a specific embodiment of the one or more digital signals, data, information and/or instructions and/or electrical power or energy that may be transmitted and/or communicated via the cable 702.

In embodiments, the wellsite system 703 may be an onshore or offshore wellsite system whereby the present braking systems and methods for the winch drum system may be employed. The wellbore 704 may be formed in subsurface formation 710 by rotary drilling in a manner that is well known.

The downhole component 708 may be, for example, a drill string, such as, a logging tool string suspended within the wellbore 704. The wellsite system 703 may be used as an example system in which the present braking systems and methods may be incorporated, but a person having ordinary skill in the art will understand that the present braking systems and methods may be used in any downhole application, such as logging, formation evaluation, drilling, sampling, reservoir testing, completions, or abandonment of the wellbore 704. In embodiments, the downhole component 708 may include a bottom hole assembly and/or a drill bit may be coupled to and/or connected to a lower end of the drill string.

In embodiments, the downhole component 708 may be adapted and/or configured to detect, collect and/or measure one or more measurements relating to one or more characteristics and/or properties associated with the wellbore 704 and/or the formation 710. The downhole component 708 may be, for example, a tool, a power source, a coil, an antenna, an electrode, a sensor, or another downhole component as known to one of ordinary skill in the art. For example, the downhole component 708 may be one or more tools, sensors, or other devices for collecting one or more measurements relating to one or more characteristics and/or properties associated with the formation 710 and/or the wellbore 704. The downhole component 708 may be housed in, for example, a drill collar, as is known in the art, and/or may contain one or a plurality of known types of telemetry, survey or measurement tools, such as, logging-while-drilling tools (hereinafter "LWD tools"), measuring-while-drilling tools (hereinafter "MWD tools"), near-bit tools, on-bit tools, and/or wireline configurable tools (hereinafter "wireline tools").

The LWD tools may include capabilities for measuring, processing, and storing information, as well as for communicating with surface equipment. Additionally, the LWD tools may include one or more of the following types of logging devices that measure formation characteristics and/or properties: a resistivity measuring device; a directional resistivity measuring device; a sonic measuring device; a nuclear measuring device; a nuclear magnetic resonance measuring device; a pressure measuring device; a seismic measuring device; an imaging device; a formation sampling device; a natural gamma ray device; a density and photoelectric index device; a neutron porosity device; and a borehole caliper device. It should be understood that the downhole component 708 may be any LWD tool as known to one or ordinary skill in the skill.

The MWD tools may include one or more devices and/or sensors for measuring characteristics and/or properties of the wellbore 704 and/or the formation 710. The MWD tools may include one or more of the following types of measuring devices: a weight-on-bit measuring device; a torque measuring device; a vibration measuring device; a shock measuring device; a stick slip measuring device; a direction measuring device; an inclination measuring device; a natural gamma ray device; a directional survey device; a tool face device; a borehole pressure device; and a temperature device. The MWD tools may detect, collect and/or log data and/or information about the conditions at and/or around the formation 710. It should be understood that the downhole component may be any MWD tool as known to one of ordinary skill in the art.

The wireline tools may be a tool commonly conveyed by the cable 802 as known to one having ordinary skill in the art. For example, the wireline tools may be logging tools for sampling or measuring characteristics and/or properties of the formation 710, such as gamma radiation measurements, nuclear measurements, density measurements, resistivity measurements and/or porosity measurements. In embodiments, the downhole component 708 may be a well completion tool for extracting reservoir fluids after completion of drilling. It should be understood that the downhole component may be any wireline tool as known to one of ordinary skill in the art.

In an embodiment, the downhole component may 708 be or may include one or more transmitters, receivers and/or sensors (hereinafter "sensors") that may be housed within one or more drill collars and/or one or more walls of the one or more drill collars. It should be understood that the downhole component 808 may include any number of sensors and/or the sensors may be any sensor as known to one of ordinary skill in the art.

In embodiments, the downhole component 708 may include sensors that may detect, collect, log and/or store data concerning the operation of the wellsite 703 and/or the formation 710. For example, the sensors of the downhole component 708 may be provided to measure parameters such as standpipe pressure, hookload, depth, surface torque, rotary rpm and the like. The sensors of the downhole component 708 may detect, collect, log and/or store any data that may be detected, collected, logged and/or stored as known to one of ordinary skill in the art.

In embodiments, the sensors of the downhole component 708 may be provided in an interface to measure various wellbore parameters, such as temperature, pressure (standpipe and/or mud), mud flow, noise, vibration and/or drilling mechanics (i.e. torque, weight, acceleration and/or pipe rotation). The sensors of the downhole component 708 may also be linked to an analog front end for signal conditioning and/or to a processor for processing and/or analyzing data. The sensors of the downhole component 708 may also be used to perform diagnostics. The diagnostics can be used to locate faults in the drill string, measure noise and/or characteristics associated with the drill string, and perform other diagnostics of the wellsite 703.

The sensors of the downhole component 708 may detect, collect and/or log data associated with resistivity of the formation, such as, for example, attenuation and phase shift resistivity at different transmitter spacing and frequencies, resistivity at a drill bit and/or deep directional resistivity. The sensors of the downhole component 708 may detect, collect and/or log data associated with formation slowness, such as, for examples, compressional slowness and shear slowness. In addition, the sensors of the downhole component 708 may detect, collect and/or log formation images, such as, for example, density borehole images and/or resistivity borehole images. Furthermore, the sensors of the downhole component 708 may detect, collect and/or log data associated with formation pressure and/or formation fluid samples. Still further, the sensors of the downhole component 708 may detect, collect and log data associated with total gamma rays, spectral gamma rays and/or azimuthal gamma rays. The sensors of the downhole component 708 may also detect, collect and/or log data associated with formation caliper, such as, for example, ultra sonic azimuthal caliper and/or density caliper. It should be understood that the data and/or information detected, collected, logged and/or stored by the sensors of the downhole component 708 may be any data and/or information as known to one of ordinary skill in the art.

The downhole component 708 may comprise, may include or may incorporate one or more power sources. The power source may be, for example, a power turbine and/or motor, a generator, a capacitor, a battery, a rechargeable battery, land-line extending from the Earth's surface 712 into the wellbore 704. In embodiments, the downhole component 808 may be a power source itself or the power source may be located and/or connected to a drill string. The power source may produce and may generate electrical power or electrical energy to be distributed throughout the drill string and/or may power the downhole component 708. It should be understood the power source may be any other electrical power generating source as known to one of ordinary skill in the art.

The present disclosure should not be deemed as limited to a specific embodiment of the tools for the downhole component 708. While the above description sets forth a description of the downhole component 708, it should be appreciated by those having ordinary skill in the art that the disclosure should not be deemed as limited to only drilling applications. It should be understood that the downhole component 708 may include any number and any type of downhole components as known to one of ordinary skill in the art.

In embodiments, the drum winch system 700 may convey and/or reel down the downhole component 708 into the wellbore 704 via the cable 708 as shown in FIG. 7. The power source 16 may, for example, rotate the drum 12 in clockwise direction (as shown by the clockwise arrowhead located within the drum 12 of FIG. 7), the drum 12 may release an entire length of, or at least a portion of the entire length of, the cable 702, and the downhole component 708 may be lower and/or conveyed downward into the wellbore 704 (as shown by the downward arrowhead in FIG. 7). The actuator 30 of the first and second brakes 18, 20 of the braking system 14 may be activated and/or engaged by the energy source 32. As a result, the brake lining 22 of the first and second brakes 18, 20 may apply braking forces to the outer surface 35 of the drum 12, rotation of the drum 12 may be reduced and/or terminated by the braking forces, and downward movement of the downhole component 708 into the wellbore 704 may be terminated. As a result, the downhole component 708 may be positioned and/or located at a first position 714 within the wellbore 704.

In embodiments, the drum 12 may subsequently be rotated in, for example, the clockwise direction to lower the downhole component 708 further downward into the wellbore 704 such that the downhole component 708 is positioned and/or located at a second position 716 within the wellbore 704. In embodiments, the drum 12 may be, for example, rotated in the counter-clockwise direction (as shown by the counter-clockwise arrowhead within the drum 12 of FIG. 7). As a result, the drum 12 may reel up and/or upwardly retrieve the downhole component 708 from the wellbore 704 (as shown by the upward arrowhead in FIG. 7). In embodiments, the braking system 14 may be activated, the brake lining 22 of the first and second brakes 18, 20 of the braking system 14 may apply braking forces to the outer surface 35 of the drum 12 and clockwise rotation of the drum 12 may be terminated by the braking forces applied by the brake lining 22. As a result, the downhole component 708 may be pulled from the wellbore 704 (not shown in the drawings) or may be positioned and/or located at a third position 718 within the wellbore 704.

The breaking forces of the brake lining 22 of the first and second brakes 18, 20 may be applied when it is desirable to reduce a rotating speed of the drum 12 and/or to terminate rotation of the drum 12. As a result, the braking system 14 may control, reduce and/or terminate rotation of the drum 12 such that the downhole component 708 may be positioned and/or located anywhere within the wellbore 704, such as, for example, the first position 714, the second position 716 and/or the third position 718 (hereinafter collectively known as "first, second and third positions 714, 716, 718"). While position at, for example, at least one of the first, second and third positions 714, 716, 718, the downhole component 708 may detect, collect and/or measure one or more measurements, data and/or information related to the wellbore 704 and/or the formation 710. The detected, collected and/or measured measurements, data and/or information may be transmitted and/or communicated from the downhole component 708 to the Earth's surface 712 via the cable 702. The present disclosure should not be limited to a specific embodiment of the first, second and third positions 714, 716, 718 the downhole component 708 within the wellbore 704.

In one embodiment, a drum winch system is disclosed, comprising: a winch drum having an outer surface, and a winch drum braking system comprising a first brake having a first brake lining, a second brake having a second brake lining and at least one ratchet linkage system connected to one of the first brake lining and the second brake lining, wherein the winch drum is located between the first brake lining of the first brake and the second brake lining of the second brake, wherein the at least one ratchet linkage system is rotatable and configured to move one of the first brake lining and the second brake lining to one of a first position and a second position, wherein, in the first position, the one of the first brake lining and the second brake lining contacts the outer surface of the winch drum to apply breaking force thereon, and further wherein, in the second position, the one of the first brake lining and the second break lining is separated from the winch drum.

In another embodiment, a drum winch system is disclosed comprising: a winch drum having an outer surface and a winch drum braking system comprising a first brake having a first brake lining, located adjacent to the winch drum, and a first three-ring ratchet linkage system connected to the first brake lining, wherein the first three-ring ratchet linkage system is configured to rotate and adapted to move the first brake lining to at least one of a first position and a second position with respect to the outer surface of the winch drum, wherein, in the first position, the first brake lining contacts the outer surface of the winch drum to apply break force thereon, and further wherein, in the second position, the first brake lining is separated from the winch drum.

A method for installing and braking a winch drum, the method comprising: providing a winch drum braking system having a first brake and a second brake, wherein the first brake comprises a first brake lining and a first ratchet linkage system connected to the first brake lining and the second brake comprises a second brake lining and a second ratchet linkage connect to the second brake lining, installing a winch drum into a space located between the first and the second brake linings, wherein the winch drum has an outer surface located adjacent to the first and second brake linings, wherein the winch drum is rotatable at a first rotational speed, and moving the first and second brake linings inwardly with respect to the winch drum to apply braking forces to the winch drum.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A drum winch system comprising:
a winch drum having an outer surface; and
a winch drum braking system comprising a first brake having a first brake lining, a second brake having a second brake lining and at least one ratchet linkage system connected to one of the first brake lining and the second brake lining, wherein the at least one ratchet linkage system is a three-ring ratchet linkage system comprising an inner ring, an intermediate ring and an outer ring, wherein the outer ring is connected to the first brake lining of the first brake and the intermediate ring is connected to an actuator wherein at least two of the rings of the inner ring, intermediate ring, and outer ring have a plurality of pawls;

wherein the winch drum is located between the first brake lining of the first brake and the second brake lining of the second brake, wherein the at least one ratchet linkage system is rotatable and configured to move one of the first brake lining and the second brake lining to one of a first position and a second position, wherein, in the first position, the one of the first brake lining and the second brake lining contacts the outer surface of the winch drum to apply breaking force thereon, and further wherein, in the second position, the one of the first brake lining and the second break lining is separated from the winch drum.

2. The system according to claim 1, wherein the at least one ratchet linkage system comprises a first ratchet linkage system, that is configured to rotate and connected to the first brake lining of the first brake, and a second ratchet linkage system, that is configured to rotate and connected to the second brake lining of the second brake.

3. The system according to claim 1, wherein the actuator is a hydraulic cylinder.

4. A drum winch system comprising:
a winch drum having an outer surface; and
a winch drum braking system comprising a first brake having a first brake lining, located adjacent to the winch drum, and a first three-ring ratchet linkage system connected to the first brake lining,
wherein the first three-ring ratchet linkage system is configured to rotate and adapted to move the first brake lining to at least one of a first position and a second position with respect to the outer surface of the winch drum, wherein, in the first position, the first brake lining contacts the outer surface of the winch drum to apply break force thereon, and further wherein, in the second position, the first brake lining is separated from the winch drum; wherein the first three-ring ratchet linkage system comprises an inner ring, an intermediate ring and an outer ring, wherein the outer ring is connected to the first brake lining of the first brake and the intermediate ring is connected to an actuator; wherein the actuator connected to the first three-ring ratchet linkage system is configured to rotate at least one ring of the three-ring ratchet system; wherein at least two of the rings of the inner ring, intermediate ring, and outer ring have a plurality of pawls.

5. The system according to claim 4, wherein the braking system further comprising:
a second brake having a second brake lining and a second three-ring ratchet linkage system connected to the second brake lining, wherein the winch drum is located between the first brake lining of the first brake and the second brake lining of the second brake.

6. The system according to claim 4, wherein the actuator is a hydraulic cylinder.

7. A method for installing and braking a winch drum, the method comprising:
providing a winch drum braking system having a first brake and a second brake, wherein the first brake comprises a first brake lining and a first ratchet linkage system connected to the first brake lining and the second brake comprises a second brake lining and a second ratchet linkage connect to the second brake lining, wherein at least one of the first ratchet linkage system and the second ratchet linkage system comprises a three-ring ratchet system having an inner ring, an intermediate ring and an outer ring, wherein the outer ring is connected to the first brake lining of the first brake or the second brake lining of the second brake; wherein at least two of the rings of the inner ring, intermediate ring, and outer ring have a plurality of pawls;
installing a winch drum into a space located between the first and the second brake linings, wherein the winch drum has an outer surface located adjacent to the first and second brake linings, wherein the winch drum is rotatable at a first rotational speed; and
moving the first and second brake linings inwardly with respect to the winch drum to apply braking forces to the winch drum.

8. The method according to claim 7, further comprising:
rotating the first and second ratchet linkage systems such that the first and second brake linings tilt outwardly with respect to each other to provide the space for installation of the winch drum between the first and second brake linings.

9. The method according to claim 7, further comprising:
applying braking forces to the winch drum, that is rotating at the first rotational speed, by contacting the outer surface of the winch drum with the first and second brake linings such that the braking forces reduce rotation of the winch drum from the first rotational speed to at least one of a second rotational speed and terminate rotation of the winch drum.

10. The method according to claim 7, further comprising:
rotating the first and second ratchet linkage systems such that the first and second brake linings move inwardly with respect to the winch drum and contact the outer surface of the winch drum to apply breaking forces to the winch drum.

11. The method according to claim 7, further comprising:
rotating the first and second ratchet linkage systems such that the first and second brake linings move outwardly with respect to the winch drum and separate from the outer surface of the winch drum.

12. The method according to claim 11, further comprising:
one of rotating the intermediate ring with an actuator connected to the intermediate ring such that the outer ring rotates to move at least one of the first brake lining and the second brake lining at least one of inwardly and outwardly with respect to the outer surface of the winch drum; and
rotating the inner ring such that the intermediate ring and the outer ring rotate to move at least one of the first brake lining and the second brake lining outwardly with respect to the outer surface of the winch drum.

13. The method according to claim 7, wherein the winch drum is a wireline cable winch drum having a wireline cable spooled on the winch drum.

14. The method according to claim 13, further comprising:
deploying the wireline cable and a downhole component connected to the wireline cable from the winch drum and into a wellbore of a well site system.

* * * * *